Figure 1:
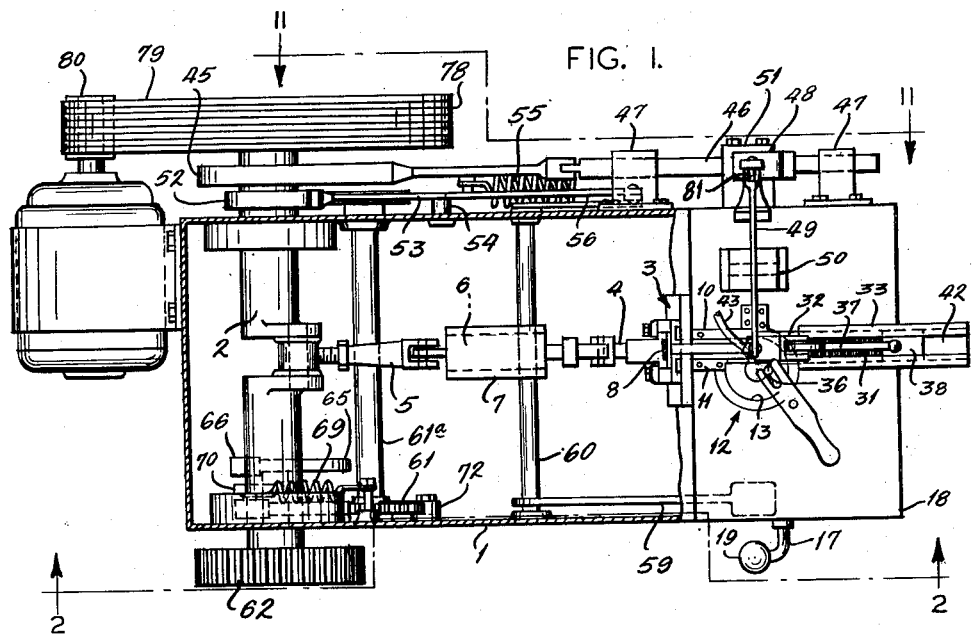

May 19, 1953 K. W. KLINKSIEK 2,638,661
COMMUTATOR FORMING AND ASSEMBLING MACHINE
Filed June 24, 1948 5 Sheets-Sheet 1

INVENTOR:
Karl W. Klinksiek,
By Cann & Cann Gravely,
HIS ATTORNEYS.

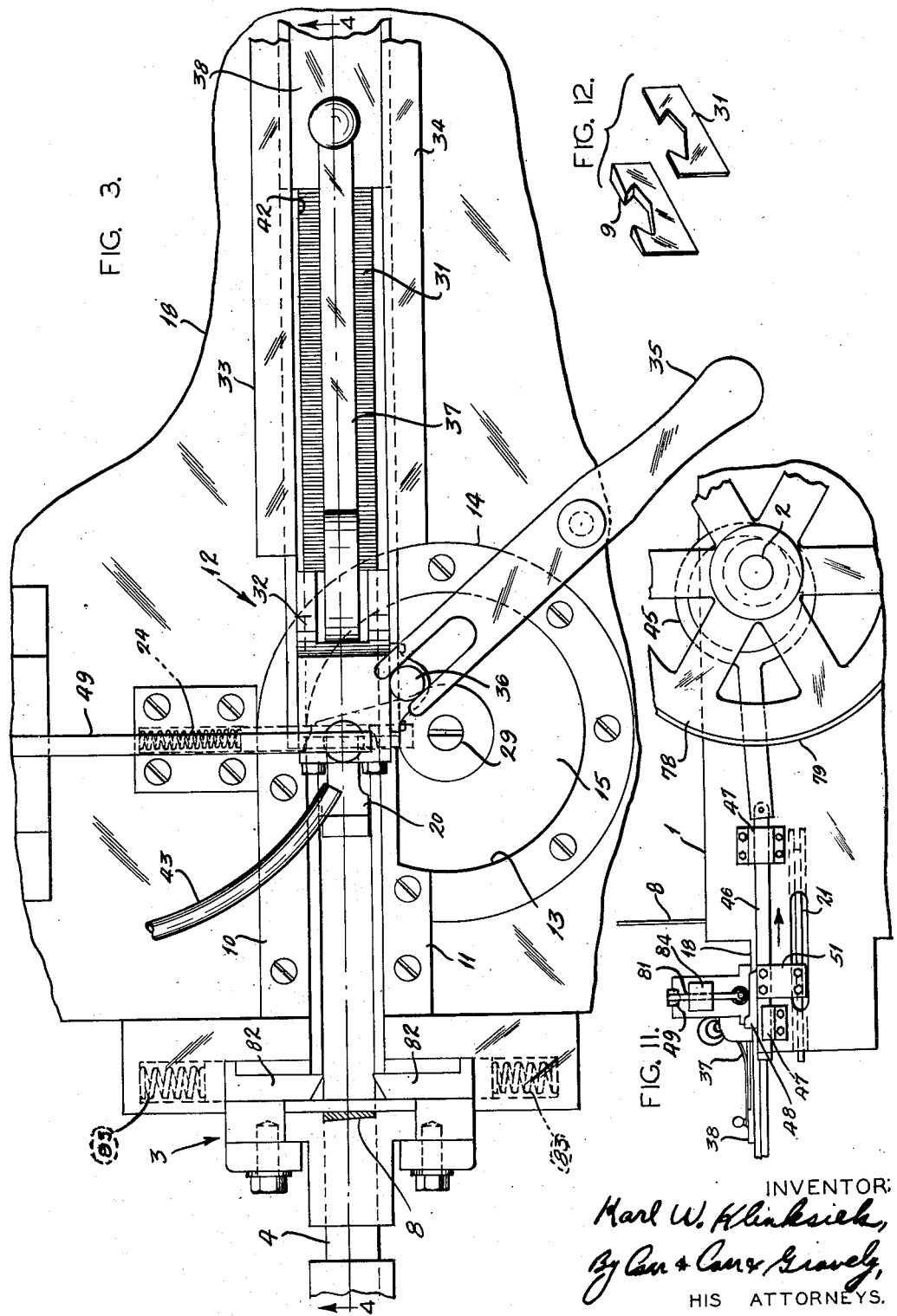

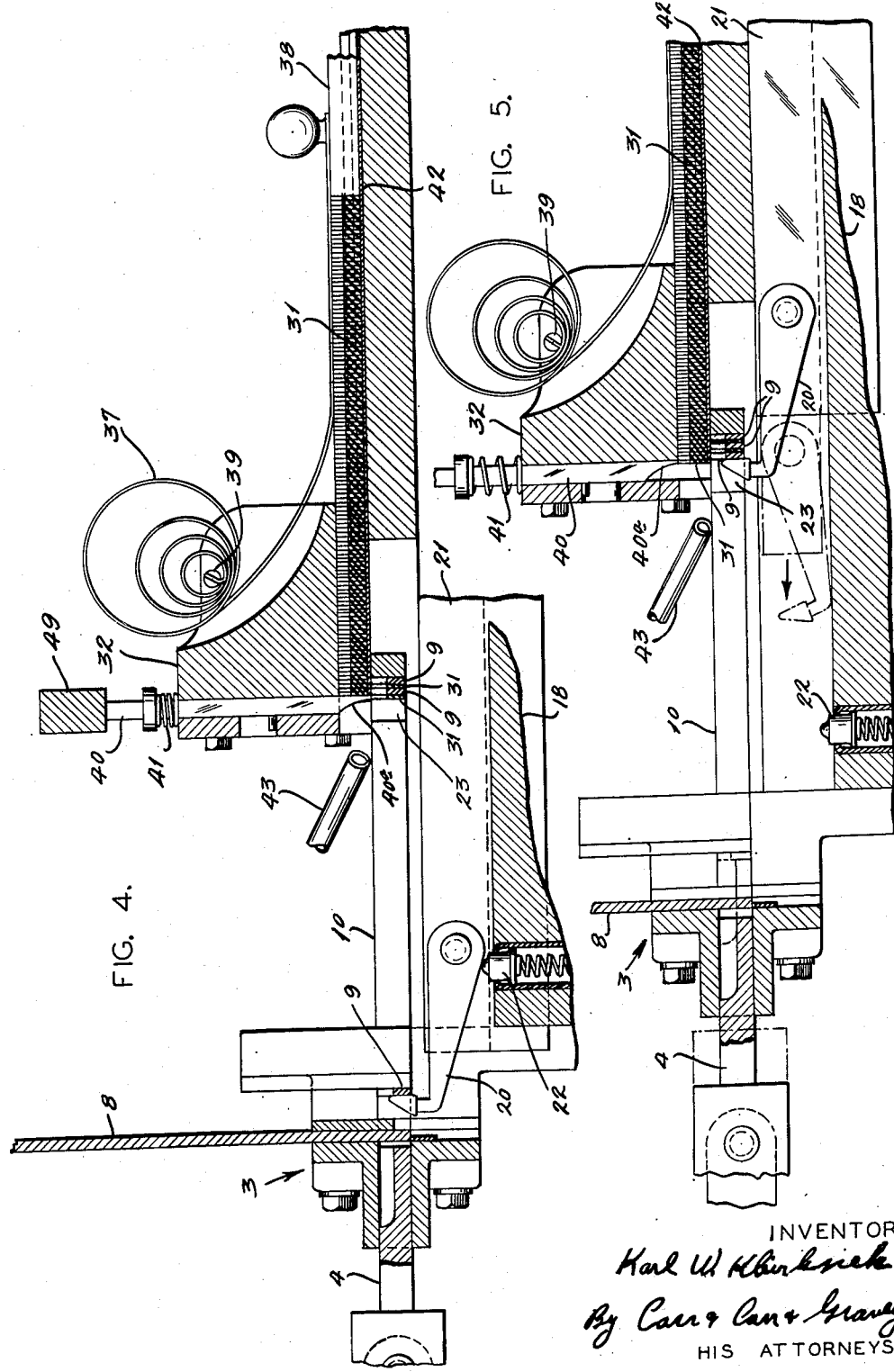

May 19, 1953     K. W. KLINKSIEK     2,638,661
COMMUTATOR FORMING AND ASSEMBLING MACHINE
Filed June 24, 1948     5 Sheets-Sheet 4
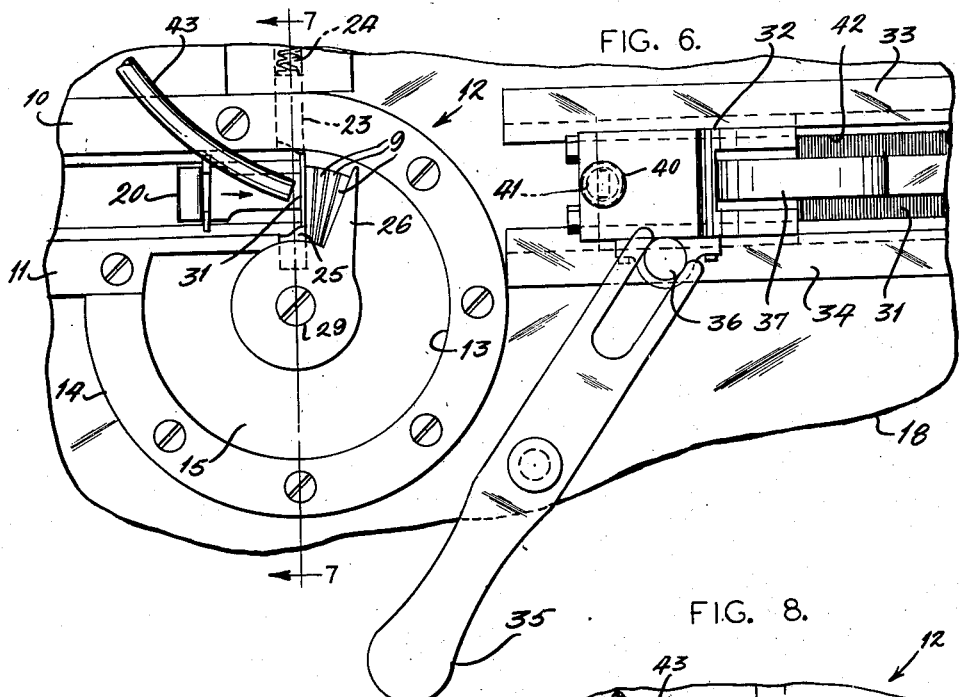
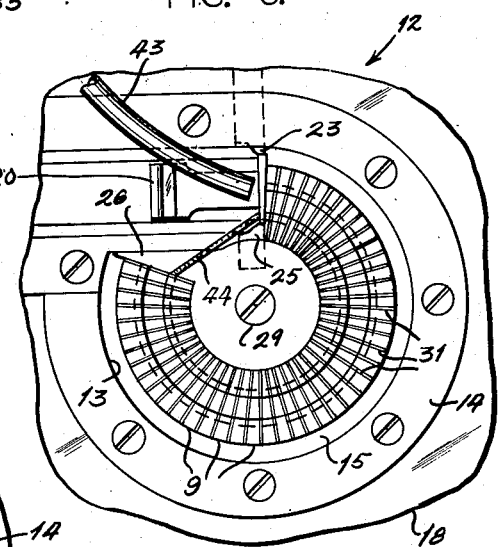
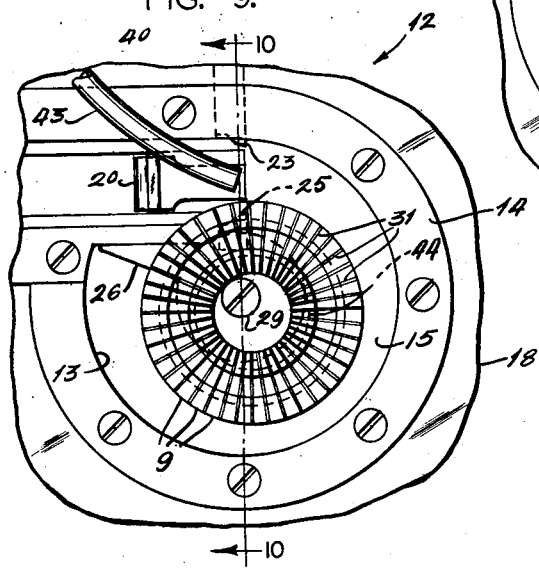
INVENTOR
Karl W. Klinksiek,
By Carr & Carr & Gravely
HIS ATTORNEYS May 19, 1953     K. W. KLINKSIEK     2,638,661
COMMUTATOR FORMING AND ASSEMBLING MACHINE
Filed June 24, 1948     5 Sheets-Sheet 5
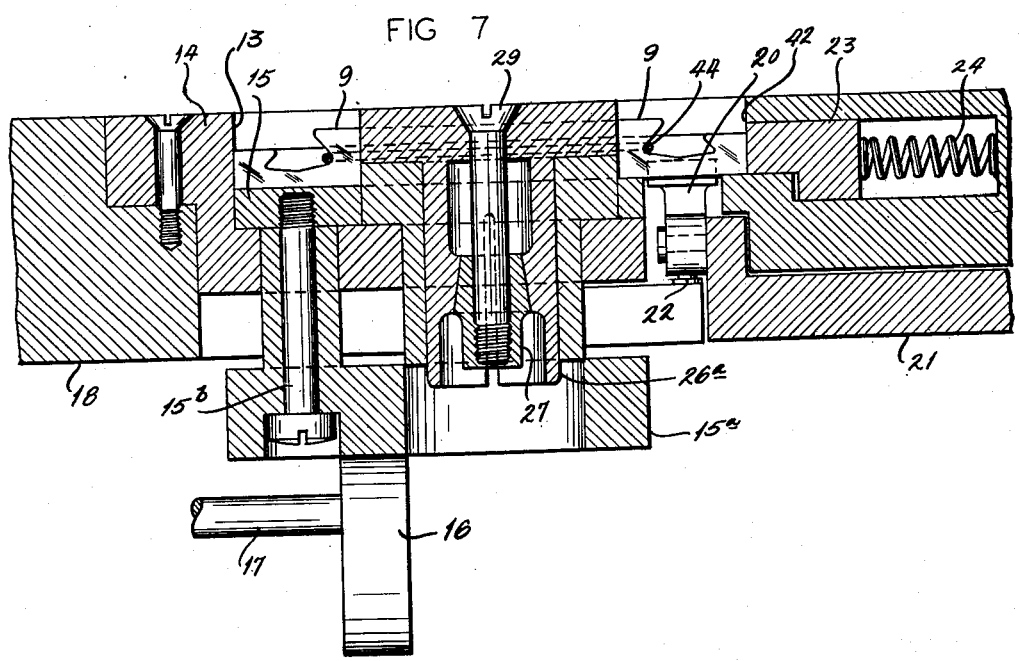
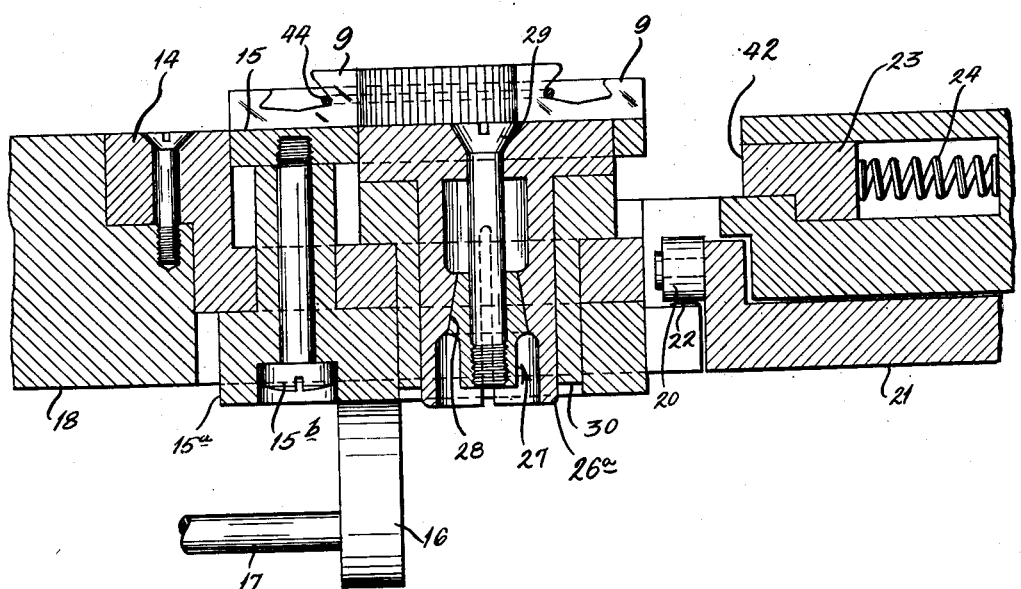
INVENTOR:
Karl W. Klinksiek,
By Carr & Carr & Gravely,
HIS ATTORNEYS.

Patented May 19, 1953

2,638,661

UNITED STATES PATENT OFFICE 2,638,661

COMMUTATOR FORMING AND ASSEMBLING MACHINE

Karl W. Klinksiek, Richmond Heights, Mo., assignor to Wagner Electric Corporation, St. Louis, Mo., a corporation of Delaware Application June 24, 1948, Serial No. 34,884

13 Claims. (Cl. 29—33)

This invention relates to apparatus for manufacturing a commutator associated with wound armatures for rotating electrical machinery and is more particularly directed to a machine for punching commutator segments and assembling same with the insulating segments inserted therebetween.

Heretofore, commutator segments, both insulating and conducting, were assembled manually in suitable jigs or fixtures by operators who selected preformed commutator segments from a supply thereof and assembled them into the jig or fixture, matching them during the process of assembling and interposing between each of the conducting segments a piece of insulating material, preferably mica, in order to produce an assembled commutator. This operation involves counting segments with the consequent opportunities for error in a count as well as an improper assembly of one or more segments into the completed commutator. After assembling these alternate segments of conducting and insulating material into suitable stacks in the jig or fixture, they are then further processed to prepare the completed structure for mounting on the rotor shaft of the electric machine for connection to the armature windings thereon.

The object of this invention is to provide an apparatus that will cut conducting segments for commutators from suitable bar stock, assemble a predetermined number of them into a suitable fixture, and, while assembling, will interpose a segment of insulating material between adjacent segments.

Another object of the invention is to produce a commutator segment assembly machine which will avoid the necessity for an individual examination of each conducting and insulating segment thereof and which will stack them in proper relationship in a suitable fixture.

A further object of the invention is to provide a commutator segment assembling machine which will count the necessary conducting and insulating segments that are to be assembled into a completed commutator and which provides means for arresting the motion of the machine as soon as the proper number of segments have been assembled.

Figure 2:
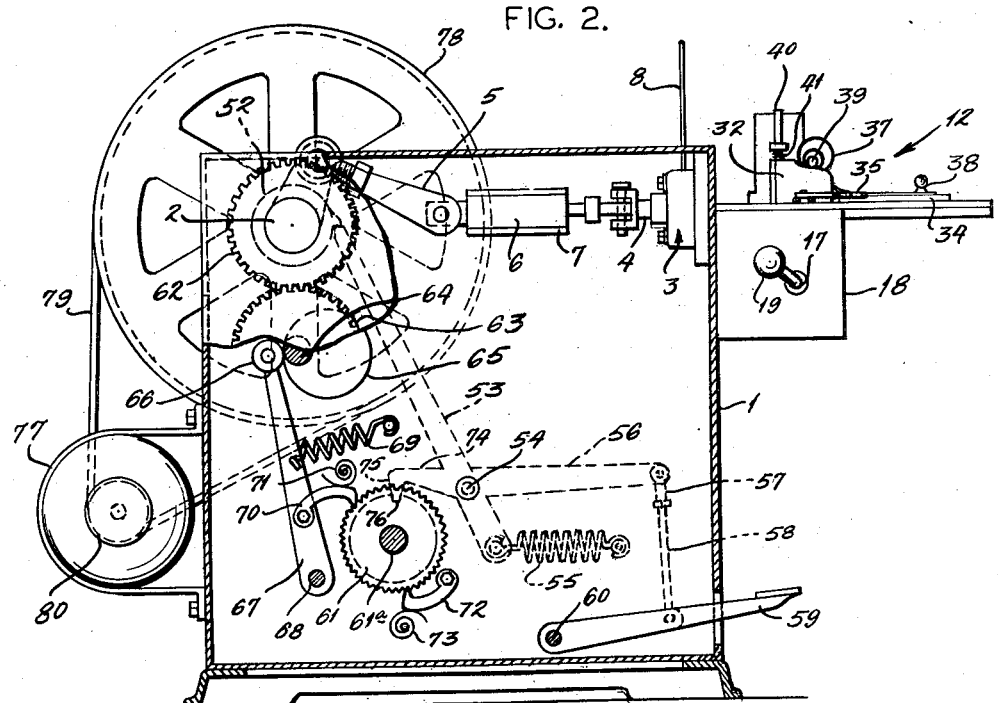

In the drawings:

Fig. 1 is a plan view of the machine with a portion of the casing removed to show operating details, Fig. 2 is a section view taken along the line 2—2 of Fig. 1, Fig. 3 is an enlarged plan view of the commutator segment assembling mechanism, Fig. 4 is a section view taken substantially along the line 4—4 of Fig. 3, but with certain of the movable members in a different position from that shown in Fig. 3, Fig. 5 is a view similar to Fig. 4 but with the parts thereof in a still different operating position, Fig. 6 is an enlarged plan view of the insulation retaining and segment assembling devices, Fig. 7 is a section view taken substantially along the line 7—7 of Fig. 6, showing a section of the commutator assembly fixture with the ultimate number of segments assembled therein as shown in Fig. 8, Fig. 8 is a plan view of the commutator segment assembly fixture at the completion of one cycle of operation, Fig. 9 is a view similar to Fig. 8 but with the segment supporting portion of the fixture in elevated position to show the commutator segments formed into a circular form, Fig. 10 is a view similar to Fig. 7 taken substantially along the line 10—10 of Fig. 9, with the parts in position for permitting the removal of the assembled commutator segments, Fig. 11 is a view taken substantially along the line 11—11 of Fig. 1; and Fig. 12 is a perspective view of the conducting and insulating segments of a commutator.

Referring now to Figs. 1 and 2, the casing 1 supports the operating mechanism which consists of a crankshaft 2 rotatably mounted in suitable bearings arranged in the casing 1. A die mechanism 3 is secured to one of the walls of casing 1 and the movable punch 4 of the die is reciprocated by the crankshaft 2, there being an adjustable length connecting rod 5 suitably connected to a cross-slide 6 reciprocably mounted in a suitable slide bearing 7, the punch 4 being connected to the cross-slide 6. The die mechanism 3 has a slot formed in the upper end thereof in which a bar 8 of commutator stock is inserted, the bar 8 having a cross-section that is the same as that of the resultant commutator segment.

The punched conducting segments 9 are illustrated in Fig. 12. After the punching operation, which forms them to the desired size and shape, they are passed between resiliently supported stripper fingers 82 and are then received in a way formed by rails 10 and 11 for movement to an assembly fixture (Figs. 6 through 10) generally designated by the numeral 12. The fixture 12 is provided with a circular commutator stack way 13 that is substantially an extension of the way formed by rails 10 and 11. This fixture 12, which contains the commutator stack way 13 (Fig. 8) is made from a suitably machined ring 14 that has a segment supporting plate 15 disposed therein which is vertically movable in the ring 14 (Figs. 7 and 10), the vertical movement being accomplished by means of plate lifting cam 16 secured to a shaft 17 rotatably supported in a housing 18 (Fig. 1) that receives the aforesaid structure. The cam 16 acts on plate 15a connected to plate 15 by screw 15b. A handle 19 is secured to the shaft 17 which, upon rotation, will move the plate 15 from the position illustrated in Fig. 7 to the position illustrated in Fig. 10.

The mechanism for moving conducting segments 9 in the way formed by rails 10 and 11 comprises a segment engaging lever 20 (Figs. 4 and 5) pivotally secured to a slide 21 reciprocably mounted in suitable ways formed in the housing 18. The mechanism for reciprocating the slide 21 will be subsequently described. The segment engaging lever 20 is provided with a pointed end which extends at right angles to the major length thereof and is moved upwardly by means of a spring-pressed member 22 so that the pointed end will be placed in position to draw a commutator segment 9 into the way formed by rails 10 and 11 and ultimately into the circular stack way 13 in the fixture 12. In order that the commutator segments may move into the circular commutator stack way in a proper manner, a spring-pressed movable finger 23 is provided which is arranged in a suitable bore provided in the housing 18 of the fixture. When segment engaging lever 20, carrying a conducting segment 9, moves in the direction of the arrow, as viewed in Fig. 6, it will cause the segment to compress the finger spring 24 and cause the segment to ride up a cam surface on the stationary finger 25 where the segment will be held in correct position to be forced into the circular stack way 13 by the succeeding segment. The segments are maintained in the vertical position on the edge opposite the slot therein by means of a retainer arm 26 that is rotatably supported in the fixture 12. Free rotation of retainer arm 26 is prevented by a frictional lock 27 (Fig. 7) comprising a tapered nut 28 threaded onto a screw 29 with the nut acting against the split lower ends of cylindrical projection 26a on the retainer arm 26 so as to urge them frictionally into engagement with the walls of the bore provided in the frame 30 supported in housing 18. The tensioning of the screw 29 will determine the amount of friction between the two parts but this will not be of such an extent as to prevent the rotation thereof under the influence of segments being introduced into the commutator stack way 13 by the lever 20.

Means have been provided for introducing an insulating segment 31 (Fig. 4) in between the adjacent conducting segments 9 during the process of the assembly of the commutator segments. The insulating segments are arranged in a fixture 32 (Fig. 6) slidably mounted in suitable rails 33 and 34 secured to the housing 18 and is manually movable therein by means of a lever 35 provided with a forked end that engages a boss 36 mounted upon the insulation fixture 32. The insulation consists of preformed segments assembled in the insulation carrying way 42 formed in fixture 32. The insulating segments are moved forwardly in insulation carrying way 42 by means of a tension spring 37, one end of which is secured to a block 38 slidably mounted in the insulation carrying way 42 and whose other end is wound about a suitable pin 39 secured to the fixture 32, the block 38 moving forwardly under the influence of spring 37 as the insulating segments are decreased in number. The rails 33 and 34 are assembled in alignment with the rails 10 and 11 in such a manner that an insulating segment is inserted in circular stack way 13 after each injection of a conducting segment 9 between fingers 23 and 25 in the manner illustrated in Figs. 4 and 5. A segment inserting bar 40 is vertically movable in a suitable aperture provided in the fixture 32 and at its lower end is provided with an insulating segment engaging edge 40a which is moved to its upward position by the spring 41 following each downward movement of the bar 40. The fixture 32 is moved to a position relative to the assembly fixture 12 so that the edge 40a is positioned in substantial alignment with the rear edge of the last introduced conducting segment 9 so that upon downward motion of the segment inserting bar 40, the insulating segment 31 will be properly positioned between the last punched conducting segment and the next punched conducting segment to be delivered from the die assembly 3. In order to prevent the insulating segment tipping over, because it is introduced and positioned edgewise in the circular stack way 13 provided in fixture 12, the discharge end of a tube 43 is positioned so that a stream of air discharged therefrom will be directed against the insulating segment 31 (see Fig. 4) for holding it on edge and up against the last introduced conducting segment 9.

From the foregoing it is evident that the punch 4 and the segment inserting bar 40 are alternately operated so that following each positioning of a conducting segment 9, an insulating segment 31 will be positioned at the entrance to the circular stack way 13 and under the influence of the slide 21, segment engaging lever 20 feeds alternate conducting and insulating segments past the fingers 23 and 25 and the retainer arm 26 will be rotated relative to the fixture 12. As soon as the requisite number of conducting and insulating segments have been assembled in the circular stack way 13, the motion of the machine is stopped, whereupon the fixture 32 is manually moved away from its operative position, as shown in Fig. 3, to that shown in Fig. 6, and a rubberband 44 is then placed in the dovetailed notch in the commutator assembly, as illustrated in Figs. 7 and 8. The shaft 17 and its cam 16 are then rotated by means of the handle 19 (Fig. 2) to lift the bottom plate 15 so that its upper surface will be flush with the upper surface of the ring 14. The force exerted by the rubberband 44 will then cause the segments of the commutator to close into a complete circle as shown in Figs. 9 and 10. During the assembly operation, it is not feasible to attempt to form the commutator into a complete circle in a circular way since it is necessary to prevent interference of the first segments introduced in the circular way 13 with the way between the rails 10 and 11 in the course of operation. As soon as the motion of the machine has been stopped, the assembled commutator with the rubberband inserted in place is moved from the Fig. 7 position to the Fig. 10 position ready for removal from the fixture. The tension of the rubberband will hold the segment assembly in circular form, thereby enabling its quick removal from the machine for subsequent operations. The cam 16 is then reversely rotated, which will enable the segment supporting plate 15 to be dropped to the Fig. 7 position preparatory to the initiation of another cycle of operation.

The crankshaft 2 (Figs. 1 and 2), rotatably mounted in casing 1, is provided with an accentric mechanism 45 that actuates a rod 46 slidably arranged in bearings 47. A horizontal cam 48 (Figs. 1 and 11) is secured to the rod 46 and actuates a rocker arm 49 pivotally supported at 50 on the housing 18 for the fixture 12 through the push rod 81 (Fig. 11). This push rod is supported in the bearing 84 fastened to housing 18. During operation, rocker arm 49 is aligned with segment inserting bar 40 so that as the rod 46 is reciprocated, its cam 48 will actuate rocker arm 49 through the push rod 81 for the purpose of inserting an insulating segment 31 in the mouth of the circular stack way 13 in the fixture 12. Secured to the reciprocating rod 46 is a plate 51 (Fig. 11) that is also suitably secured to the slide 21 for actuating the segment engaging lever 20 which brings a conducting segment of the commutator into position in the circular stack way 13. As previously indicated, the reciprocatory motion of the slide 21 and of the rocker arm 49 is such that a conducting segment will be placed in posiiton followed immediately by an insulating segment.

The control mechanism for arresting motion of the machine consists of a clutch 52 operatively connected to the crankshaft 2. This clutch is actuated by a lever 53 pivotally supported on a shaft 54 that extends transversely to and is journaled in one side of the casing 21. The lever 53 is urged counterclockwise or to the Fig. 2 position by a spring 55. Integrally associated with the lever 53 is a second lever 56, one end of which has a fitting 57 thereon that enables it, by means of linkage 58, to be connected to a manually operated lever 59 pivotally supported in casing 1 on a shaft 60. The manually operated lever 59 is preferably foot-operated to enable the machine operator to operate the other portions of the machine with his hands, such as handle 19, retainer arm 26 and lever 35.

The number of reciprocations of the rod 46 is controlled by a ratchet wheel 61 secured to shaft 61a rotatably mounted in casing 1 that controls the disengagement of the clutch 52 after an operating cycle has been initiated. Ratchet wheel 61 is operated from the crankshaft 2 by a gear 62 mounted thereon that meshes with a gear 63 secured to a countershaft 64 rotatably mounted in the casing 1. The counter-shaft 64 has an eccentric 65 secured thereon that is engaged by a follower roller 66 rotatably mounted on one end of a lever 67 pivotally supported on a shaft 68 mounted in casing 1. A tension spring 69, one end of which is anchored to the casing 1 and whose other end is secured to the lever 67 keeps the follower 66 in engagement with the eccentric 65. A ratchet pawl 70 is pivoted to the lever 67 at its one end and at its opposite end has an edge formed thereon that engages the teeth of the ratchet wheel 61. A spring 71 urges the pawl 70 into engagement with the ratchet wheel 61 but will permit relative rotation of the pawl with respect to the wheel in one direction of operation. A holding follower pawl 72 is suitably pivotally supported in the casing 1 at its one end and at its opposite end is provided with an edge likewise engageable with the ratchet wheel 61. A spring 73 urges the follower pawl 72 into engagement with the ratchet wheel 61. Pawl 72 prevents reverse rotation of ratchet wheel 61 when lever 67 is moved counter-clockwise (Fig. 2).

The lever assemblies 53 and 56 have an extension 74 provided thereon in the manner illustrated in Fig. 2 that is provided with a hook 75 engageable in a notch 76 cut into an extension in the ratchet wheel 61. The outboard end of the crankshaft 2 is rotated by the motor 77 connected to the combination pulley and flywheel 78 by means of a belt 79 that is also passed around a pulley 80 on the motor 77.

Assuming that a cycle of operation is to be initiated, the operator depresses the lever 59 that lifts the hook 75 from the notch 76 and simultaneously permits the engagement of the clutch 45 by the withdrawal of the lever 53 therefrom. Rotation of the crankshaft 2 commences and then the lever 53 is held clear of the clutch because the hook 75 rides on the periphery of the extension or hub of ratchet wheel 61, being urged thereagainst by spring 55. The eccentric 65 is rotated by the crankshaft 2 through the gears 62 and 63 and each rotation of the eccentric will cause the pawl 70 to advance ratchet wheel 61 through a predetermined degree of rotation which is directly proportional to the number of segments to be assembled in the commutator, it being preferred that the number of teeth on the segment wheel 61 be equal to the number of pairs of conducting segments 9 and insulating segments 31 in the commutator. When the predetermined number of segments has been delivered to the stack way 13, the hook 75 on the extension 74 will be urged into the notch 76 under the influence of spring 55, placing the lever 53 in the position shown in Fig. 2, thereby arresting the operation of thhe machine.

At the beginning of a cycle of operation, the operator will rotate the shaft 17 so that the eccentric 16 will be in the position illustrated in Fig. 7, thereby placing the segment supporting plate 15 in the Fig. 7 position so that the upper surface thereof will be in alignment with the rails 10 and 11. He will then manually move the retainer arm 26 to the starting position which is substantially that illustrated in Fig. 6 or in which the radial surface on the retainer arm 26 will be in a position substantially parallel to and adjacent to the back of the fingers 23 and 25, and he will also operate lever 35 so as to bring the segment inserting bar 40 into alignment with the rocker arm 49 (Fig. 1). At this point he will depress the pedal 59 to initiate the cycle of operation previously described, thereby setting the machine in operation.

The rotation of the crankshaft 2 (Fig. 2) operates punch 4 to force it into die mechanism 3 to cut a segment 9 from bar stock 8. The newly cut segment 9 is pushed forward until it is held in the grip of stripper fingers 82 (Fig. 3) moved toward each other by springs 83, all of which is associated with die mechanism 3. The stripper fingers hold the segment 9 while the punch moves away from the die after which the segment engaging lever 20 engages same and moves it toward the fingers 23 and 25 at the mouth of circular stack way 13.

The conducting segment 9 now passes fingers 23 and 25 and is positioned against the radial surface of retainer arm 26 which is moved one segment space by segment engaging lever 20 to the Fig. 5 position from the Fig. 4 position. Thereafter the rocker arm 49 will be actuated by the cam 48 to insert an insulating segment 31 by means of segment inserting bar 40 in stack way 13 and position it adjacent to the conducting segment 9. The air stream issuing from tube 43 holds the insulating segment in upright position against conducting segment 9 until the next conducting segment is put in place. This sequence of operation will continue until the required number of conducting and insulating segments has been assembled in the circular stack way 13 in fixture 12, whereupon the clutch will be disengaged when the hook 75 drops into notch 76 of the ratchet wheel 61, causing the clutch 52 to be disengaged. Thereupon the operator will move the fixture 32 to the rear and place a rubberband in the dovetailed grooves of the assembled commutator, rotate the shaft 17 to lift the assembled commutator segments to the Fig. 10 position, whereupon the resiliency of the rubberband will cause the commutator to assume the circular form illustrated in Fig. 9. One cycle of operation of the machine has, therefore, been completed and the operator then places the several manually adjusted parts in position for the next operation.

The machine has been shown for assembling disc type commutators. It should be apparent that drum type commutators can be assembled on this machine although it may be necessary to change the configuration of the way between rails 10 and 11.

What I claim is:

1. A machine for producing commutator segment assemblies consisting of alternate conducting and insulating segments comprising means for punching the conducting segments from suitable bar stock; a fixture provided with a curved stack way for receiving said segments; means for moving said segments edgewise into said stack way and disposed radial thereto; means for holding a stack of preformed insulating segments; means for transferring an insulating segment from said stack and inserting it edgewise in said curved stack way immediately after the insertion of each conducting segment therein; means for operating said punching and insulation inserting means in timed sequence; and means for stopping said machine after a predetermined number of conducting and insulating segments have been assembled in said curved stack way.

2. A machine for producing commutator segment assemblies provided with alternate conducting and insulating segments comprising means for punching the conducting segments from suitable bar stock; a fixture having a curved stack way formed therein; a vertically movable segment supporting plate forming the bottom wall of said stack way; means for inserting said segments edgewise into said way; means for holding a stack of preformed insulating segments; means for transferring an insulating segment from said stack to said stack way and positioning it edgewise in said curved stack way adjacent to each conducting segment immediately after it has been inserted in said curved stack way; means for operating said punching and insulating segment inserting means in timed sequence; means for stopping said machine after a predetermined number of conducting and insulating segments have been assembled in said curved stack way; and means for vertically moving said plate to permit removal of the assembled commutator.

3. A machine for producing commutator segment assemblies consisting of alternate conducting and insulating segments comprising means for punching the conducting segments from suitable bar stock; a first fixture provided with a curved stack way for receiving said segments; means for moving said conducting segments edgewise into said stack way; a second fixture for holding a stack of preformed insulating segments; means for inserting an insulating segment from said stack into said stack way and positioning it edgewise in said curved stack way adjacent to each conducting segment immediately after its insertion in said stack way; means for moving said insulating segment holding fixture into position over the stack way in said first fixture; means for operating said punching and insulating segment inserting means in timed sequence; and means for stopping said machine after a predetermined number of conducting and insulating segments have been inserted in said circular stack way.

4. A machine for producing commutator segment assemblies consisting of alternate conducting and insulating segments comprising means for punching the conducting segments from suitable bar stock; a fixture provided with a curved stack way for receiving said segments; means for inserting said segments edgewise into said way; means rotatably mounted in said fixture and disposed in said curved stack way and against which said segments are supported; means for holding a stack of preformed insulating segments; means for transferring an insulating segment from said stack and positioning it edgewise in said curved way adjacent to each conducting segment immediately after its insertion in said curved stack way; means for operating said punching and transferring means in timed sequence; and means for stopping said machine after a predetermined number of conducting and insulating segments have been assembled in said curved stack way.

5. A machine for producing commutator segment assemblies consisting of alternate conducting and insulating segments comprising means for punching the conducting segments from suitable bar stock; a fixture provided with a curved stack way for receiving said segments; means for moving said segments edgewise into said stack way; means for holding a supply of preformed insulating segments; means for delivering an insulating segment from said supply and positioning it edgewise in said curved stack way adjacent to each conducting segment immediately after its insertion in said stack way; means for holding said insulating segment edgewise in said curved stack way; means for operating said punching and delivering means in timed sequence; and means for stopping said machine after a predetermined number of conducting and insulating segments have been assembled in said curved stack way.

6. A machine for producing commutator segment assemblies consisting of alternate conducting and insulating segments comprising means for punching the conducting segments from suitable bar stock; a fixture provided with a curved stack way for receiving said segments; means rotatably mounted in said fixture and disposed in said stack way and against which said segments are supported; means for holding a supply of preformed insulating segments; means for delivering an insulating segment from said supply and positioning it edgewise in said curved stack way adjacent to each conducting segment immediately after its insertion in said curved stack way; means for operating said punching and delivering means in timed sequence; and means for stopping said machine after a predetermined number of conducting and insulating segments have been assembled in said circular stack way.

7. A machine for producing commutator segment assemblies consisting of alternate conducting and insulating segments comprising means for punching the conducting segments from suitable bar stock; a fixture provided with a curved stack way for receiving said segments; means for inserting said segments edgewise into said stack way; means for holding a supply of preformed insulating segments; means for delivering an insulating segment from said supply and positioning it edgewise in said curved stack way adjacent to each conducting segment immediately after its insertion in said stack way; means for holding said insulating segment edgewise in said curved stack way; means for operating said punching and delivering means in timed sequence; and means for stopping said machine after a predetermined number of conducting and insulating segments have been assembled in said curved stack way.

8. A machine for producing commutator segment assemblies consisting of alternate conducting and insulating segments comprising means for punching the conducting segments from suitable bar stock; a fixture having a curved stack way formed therein; a vertically movable plate forming the bottom wall of said stack way; means for moving said segments edgewise into said stack way; means rotatably supported in said fixture and disposed in said stack way and against which said segments are supported; means for holding a supply of preformed insulating segments; means for delivering an insulating segment from said supply and positioning it edgewise in said curved stack way adjacent to each conducting segment immediately after it is inserted in said stack way; means for holding said insulating segment edgewise in said curved stack way; means for operating said punching and delivering means in timed sequence; means for stopping said machine after a predetermined number of conducting and insulating segments have been assembled in said curved stack way; and means for vertically moving said plate to permit removal of the assembled commutator segments.

9. A machine for producing commutator segment assemblies consisting of alternate conducting and insulating segments comprising means for punching the conducting segments from suitable bar stock; a fixture having a curved stack way formed therein; a vertically movable plate forming the bottom wall of said stack way; means for moving said segments edgewise into said stack way; means rotatably supported in said fixture and disposed in said stack way and against which said segments are supported; means for holding a supply of preformed insulating segments; means for delivering an insulating segment from said supply and positioning it edgewise in said stack way adjacent to each conducting segment immediately after its insertion in said stack way; means for holding said insulating segment edgewise in said stack way; means for moving said insulating segment holding means into position over the stack way in said fixture; means for operating said punching and delivering means in timed sequence; means for stopping said machine after a predetermined number of conducting and insulating segments have been assembled in said stack way; and means for vertically moving said curved stack way to permit removal of the assembled commutator segments.

10. A machine for assembling commutators consisting of conducting and insulating segments comprising means for forming a curved stack way; means for inserting conducting segments into said stack way; means for introducing an insulating segment adjacent each conducting segment after it is located in said stack way; means for holding erect said conducting and insulating segments in a stack in said stack way and operative on the last segment introduced therein; and means for removing said stack of conducting and insulating segments from said stack way.

11. A machine for assembling commutators consisting of conducting and insulating segments comprising means including a pair of rails forming a stack way; means forming a second stack way; means for transferring and guiding a predetermined number of conducting segments into said second mentioned stack way from said first stack way means for holding erect said conducting and insulating segments in a stack in said stack way and operative on the last segment introduced therein; and means for placing an insulating segment adjacent each conducting segment after it is located in said second stack way.

12. A machine for assembling commutators consisting of conducting and insulating segments comprising means including a pair of rails forming a stack way; means for transferring and guiding a predetermined number of conducting segments into said stack way; means including a movable bottom forming a curvilinear stack way in communication with said first mentioned stack way; means for placing an insulating segment adjacent each conducting segment after it is located in said curvilinear stack way; and means for enabling the removal of said assembled seg means from said curvilinear stack way and movable bottom.

13. A machine for assembling commutators consisting of conducting and insulating segments comprising means for forming a curved stack way; means for inserting conducting segments into said stack way; means for introducing an insulating segment adjacent each conducting segment after it is located in said curved stack way; and means for holding erect said conducting and insulating segments in a stack in said stack way and operative on the last segment introduced therein.

KARL W. KLINKSIEK.

References Cited in the file of this patent
UNITED STATES PATENTS

| Number | Name | Date |
|---|---|---|
| 1,759,500 | Frederick | May 20, 1930 |
| 1,835,120 | Poole | Dec. 8, 1931 |
| 1,899,325 | Hardman et al. | Feb. 28, 1933 |
| 1,907,561 | Oldenburg | May 9, 1933 |
| 1,966,878 | Bluzat | July 17, 1934 |
| 2,045,087 | Keller | June 23, 1936 |
| 2,127,549 | Carty | Aug. 23, 1938 |
| 2,251,326 | Cullin | Aug. 5, 1941 |
| 2,394,955 | Weber | Feb. 12, 1946 |